United States Patent
Anderson et al.

(10) Patent No.: US 12,342,188 B2
(45) Date of Patent: Jun. 24, 2025

(54) MULTI-MODE RADIO UNIT

(71) Applicant: Cisco Technology, Inc., San Jose, CA (US)

(72) Inventors: Fred Anderson, Lakeville, OH (US); Indermeet Singh Ghandi, San Jose, CA (US); Shailender Photharaju, Fremont, CA (US); Clark Carty, Brunswick, OH (US)

(73) Assignee: Cisco Technology, Inc.

( * ) Notice: Subject to any disclaimer, the term of this patent is extended or adjusted under 35 U.S.C. 154(b) by 528 days.

(21) Appl. No.: 17/814,424

(22) Filed: Jul. 22, 2022

(65) Prior Publication Data

US 2024/0031830 A1    Jan. 25, 2024

(51) Int. Cl.
*H04W 24/02* (2009.01)
*H04W 24/08* (2009.01)
*H04W 88/10* (2009.01)

(52) U.S. Cl.
CPC ........... *H04W 24/02* (2013.01); *H04W 24/08* (2013.01); *H04W 88/10* (2013.01)

(58) Field of Classification Search
None
See application file for complete search history.

(56) References Cited

U.S. PATENT DOCUMENTS

| | | |
|---|---|---|
| 2019/0090207 A1 | 3/2019 | Ye et al. |
| 2019/0342800 A1 | 11/2019 | Sirotkin et al. |
| 2020/0015132 A1 | 1/2020 | Liu et al. |
| 2020/0128414 A1* | 4/2020 | Mishra ................. H04W 48/08 |
| 2021/0321407 A1 | 10/2021 | Matsuo et al. |
| 2021/0409977 A1* | 12/2021 | Dussmann ............. H04L 45/66 |
| 2022/0030498 A1 | 1/2022 | Futaki et al. |
| 2023/0046743 A1* | 2/2023 | Vaez-Ghaemi ............................ H04B 10/25759 |
| 2023/0328579 A1* | 10/2023 | Nuggehalli ....... H04W 28/0967 |
| 2023/0328592 A1* | 10/2023 | Nuggehalli ....... H04W 28/0958 370/329 |

* cited by examiner

*Primary Examiner* — Faruk Hamza
*Assistant Examiner* — Cassandra L Decker
(74) *Attorney, Agent, or Firm* — Merchant & Gould P.C.

(57) ABSTRACT

A multi-mode radio unit, and more specifically providing a multi-mode radio unit having a 7.2 split mode and a full gNodeB (gNB) mode may be provided. A 7.2 split mode may be executed at a Multi-Mode Radio Unit (MMRU). Next a metric associated with a front-haul link between the MMRU and a Distributed Unit (DU) may be monitored. The metric may be compared to a first threshold, and when the metric is above the first threshold, the MMRU may be caused to switch from the 7.2 split mode to a full gNodeB (gNB) mode.

20 Claims, 5 Drawing Sheets

RU to gNB State Transition

MULTI-MODE RADIO UNIT

TECHNICAL FIELD

The present disclosure relates generally to providing a multi-mode radio unit, and more specifically providing a multi-mode radio unit having a 7.2 split mode and a full gNodeB mode.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
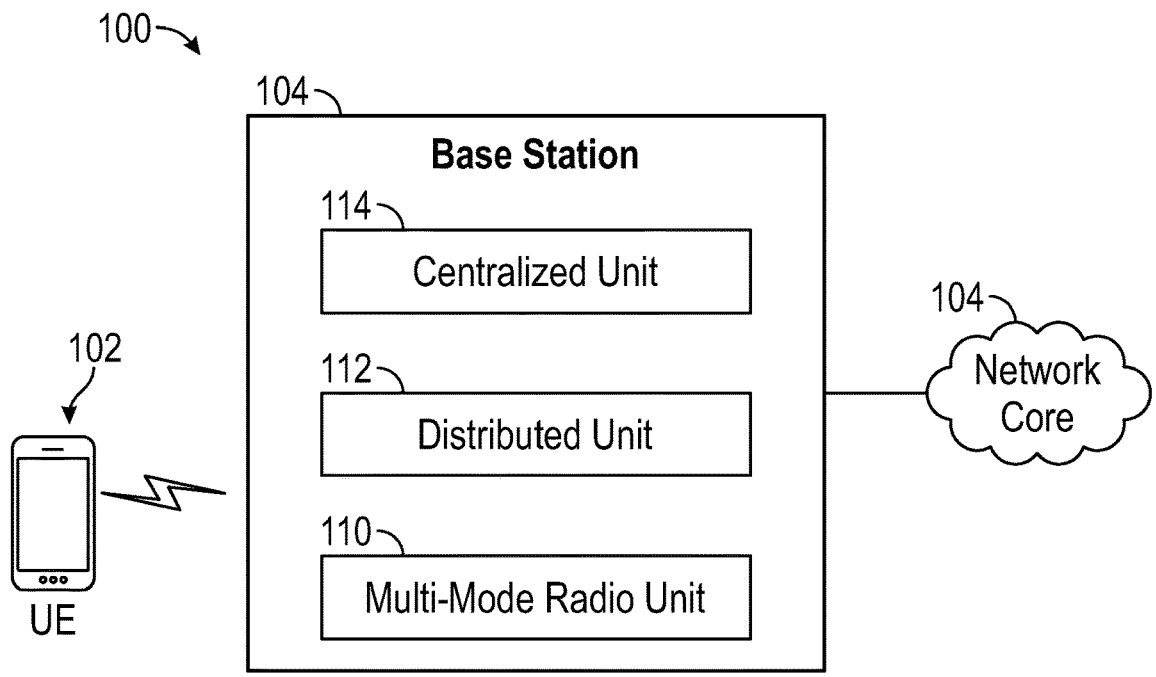
FIG. 1 is a block diagram of an operating environment for a multi-mode radio unit.

A multi-mode radio unit, and more specifically providing a multi-mode radio unit having a 7.2 split mode and a full gNodeB (gNB) mode may be provided. A 7.2 split mode may be executed at a Multi-Mode Radio Unit (MMRU). Next a metric associated with a front-haul link between the MMRU and a Distributed Unit (DU) may be monitored. The metric may be compared to a first threshold, and when the metric is above the first threshold, the MMRU may be caused to switch from the 7.2 split mode to a full gNodeB (gNB) mode.

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

EXAMPLE EMBODIMENTS

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

An open radio access network split 7.2 mode (7.2 split mode) and a full gNB mode each have advantages and disadvantages. For example, the 7.2 split mode may provide better spectrum and interference management, uniform coverage, improved reliability, centralized resource management, and simplified radio frequency (RF) planning. However, the 7.2 split mode may mandate a high throughput requirement on the front-haul interface and may need to meet tighter latency budgets. High throughput links may not always be available, and a network may suffer from latency constraints. For example, a multi-gig front-haul link may either become congested or an earlier higher Physical Layer (PHY) negotiated rate may no longer be available. There may also be a dependency on a Distributed Unit (DU) that performs upper PHY processing. If the DU faults, the Radio Unit (RU) may be inoperable until the RU discovers another DU. If the RU cannot discover another DU or the network is completely loaded, the network may be unable to provide coverage to user equipment (UE). Therefore, it may be advantageous for a RU to operate in the 7.2 split mode in certain scenarios and advantageous for a RU to operate in the full gNB mode in other scenarios.

FIG. 1 is a block diagram of an operating environment for a Multi-Mode Radio Unit (MMRU). The operating environment 100 includes a User Equipment (UE) 102, a network core 106, and a base station 104 with an MMRU 110, a Distributed Unit (DU) 112, and a Centralized Unit (CU) 114. While a single UE 102, base station 104, MMRU 110, CU 114, DU 112, and network core 106 are shown in the operating environment 100, any number of UEs 102, base stations 104, MMRUs 110, CUs 114, DUs 112, and/or network cores 106 may be included in the operating environment 100 in other embodiments. In this example, the network is a Fifth Generation (5G) network.

The UE 102 may be any device associated with a user of the 5G network, such as a mobile phone, a tablet, a modem, and the like. The base station 104 of the 5G network may receive and transmit communications between the UE 102 and the network core 106. The network core 106 may establish connectivity to the network for users and provides access to services.

The MMRU 110 may receive, process, transmit, and/or convert radio signals. The MMRU 110 may operate in multiple modes including a 7.2 split mode and a full gNB mode. The MMRU 110 may switch between the multiple modes based on network conditions. In other examples, the MMRU 110 may include other modes such as 1 split mode, 2 split mode, 3 split mode, 4 split mode, 5 split mode, 6 split mode, 8 split mode, and the like.

The MMRU 110 may have a default mode that the MMRU 110 may switch to or stay on when the network and system operating conditions allow. For example, the MMRU 110 may have the 7.2 split mode as a default mode. Thus, the MMRU 110 may initially operate in the 7.2 split mode, switch to the full gNB mode when necessary, and switch back to the 7.2 split mode when the network and system operating conditions allow.

Figure 2:
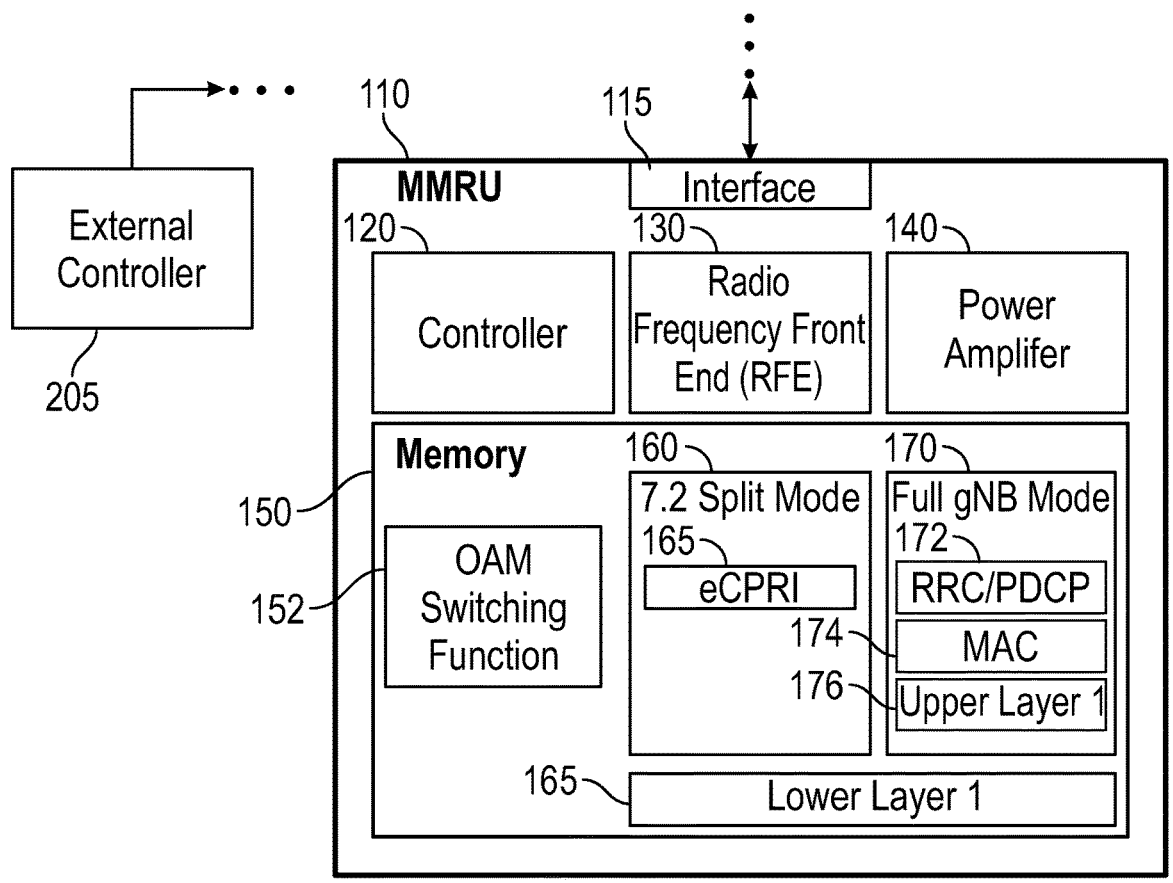
FIG. 2 is a block diagram of a multi-mode radio unit.

FIG. 2 is a block diagram of the MMRU 110. The MMRU 110 includes an interface 115, a controller 120, a Radio Frequency Front End (RFE) 130, a power amplifier 140, and a memory 150 that stores an Operation, Administration, and Management (OAM) switching function 152, a 7.2 split mode 160, a full gNB mode 170, and lower layer 1 180.

The controller 120 may control the operation of the MMRU 110, including the operation of the RFE 130 and the power amplifier 140 for example. The controller 120 may also execute operations stored on the memory 150 to control the MMRU 110. For example, the controller may execute the OAM switching function 152, the 7.2 split mode 160, the full gNB mode 170, and/or the lower layer 1 180 to control the operation of the MMRU 110.

The RFE 130 may include components for receiving, processing, and/or converting radio signals received and/or sent by the MMRU 110, such as via the interface 115 for example. The power amplifier 140 may include components for converting low-power radio signals to higher-power radio signals.

The controller 120 may evaluate the operation of the MMRU 110, the operation of a DU associated with the MMRU 110 (e.g., DU 112 shown in FIG. 1), properties of the network, and/or properties of other systems associated with the MMRU 110 to determine whether to execute the OAM switching function 152 to switch between the 7.2 split mode 160 and the full gNB mode 170. For example, the OAM switching function 152 may include the operations that the controller 120 may execute to perform the evaluation and determination of whether to switch between the 7.2 split mode 160 and the full gNB mode 170.

A device external to the MMRU 110 may determine when to switch the mode of the MMRU 110. For example, the external controller 205 may send an instruction to the MMRU 110 instructing the MMRU 110 to switch to the 7.2 split mode or the gNB mode. For example, the controller 120 may determine that an external controller 205 sent instructions to switch modes, and the controller may execute the OAM switching function 152 to switch between the 7.2 split mode 160 and the full gNB mode 170.

The MMRU 110 may send operating information to the external controller 205, the DU associated with the MMRU 110 may send operating information to the external controller 205, the external controller 205 may evaluate properties of the network, and/or the external controller 205 may receive operating information from other systems associated with the MMRU 110. The external controller 205 may use the operating information and/or the network properties to determine whether to instruct the MMRU 110 to switch modes. An external controller 205 may also instruct the MMRU 110 to perform an evaluation to determine whether to switch modes or instruct the MMRU 110 to stop evaluating and operate on the current mode. For example, the external controller 205 may be an OAM system or some other controller that controls the switching of modes for one or more MMRUs such as MMRU 110. In some examples, the controller 120 and an external controller 205 may both perform an evaluation and determination of when to switch between the 7.2 split mode 160 and the full gNB mode 170.

The operation information of the MMRU 110, the operation information of a DU associated with the MMRU 110, properties of the network, and/or operation information of other systems associated with the MMRU 110 that the MMRU 110 and/or the external controller 205 may use may include monitoring a front-haul link between the MMRU 110 and the DU, periodic measurements of the DU and MMRU 110, interference measurements at the MMRU 110, and the like.

For example, the MMRU 110 and/or the external controller 205 may determine the error rate of the network, such as the ethernet retransmission rate, service drops, and the like. The MMRU 110 and/or the external controller 205 may determine whether the error rate is higher than a threshold that indicates whether the MMRU 110 can support the 7.2 split mode. If the error rate is below the threshold, the MMRU 110 may be instructed to switch the 7.2 split mode 160 if the MMRU 110 is not yet in the 7.2 split mode 160. The types of requests over the network, network structure, current network capacity, and the like may also be evaluated to determine which mode the MMRU 110 should be in. For example, certain types of requests may require the MMRU 110 to be in a certain mode, so the MMRU 110 may switch to the certain mode to handle the requests.

The MMRU 110 and/or the external controller 205 may also determine the bandwidth of the front-haul link negotiation between the MMRU 110 and the DU. The amount of bandwidth available may be used to determine whether the 7.2 split mode may be supported or whether the MMRU 110 should operate in full gNB mode 170.

The MMRU 110 and/or the external controller 205 may also evaluate the error rate, latency, jitter, synchronization loss, and/or timing mis-adjustment of the enhanced Common Public Radio Interface (eCPRI) of the network. The evaluation of the eCPRI may be compared to a threshold to determine whether 7.2 split mode may be supported or whether the MMRU 110 should operate in full gNB mode 170.

The MMRU 110 and/or the external controller 205 may also evaluate the operation of the DU by determining the load on the DU, evaluating whether the DU is operating correctly, and the like. If the load on the DU exceeds a threshold and/or the DU is not operating correctly, the external controller 205 may instruct the MMRU associated with the DU to convert to the full gNB mode if the MMRU is not yet in the full gNB mode, such as MMRU 110 switching to the full gNB mode 170. When the load on the DU is below the threshold and/or begins operating correctly, the external controller 205 may instruct the MMRU associated with the DU to convert to the 7.2 split mode if the MMRU is not yet in the 7.2 split mode.

Any combination of the evaluations and information described above used to evaluate switching MMRU 110 modes may be used to determine whether the MMRU 110 mode should be switched. A weight may be assigned to each evaluation to assign a degree of importance for each evaluation compared to the other evaluations. For, the evaluation of the eCPRI may be assigned a higher weight than the evaluation of other evaluations, resulting in the external controller 205 being more likely to instruct the MMRU 110 to switch from the 7.2 split mode 160 to the full gNB mode 170 when the eCPRI evaluation indicates the eCPRI evaluation is over the threshold.

The external controller 205 may control the switching of multiple MMRUs at once. Thus, the external controller 205 may evaluate the performance of the multiple MMRUs as described above with respect to MMRU 110. When multiple MMRUs are evaluated by the external controller 205, the external controller 205 may organize MMRU and the associated DUs in an order indicating the MMRU and associated DU performance. The ranks may be determined based on the evaluation of the MMRU operation, the DU operation, the front-haul link negotiation, the eCPRI evaluation, the network evaluation, and the like, and the weights assigned to the respective evaluations and information. When the external controller 205 determines that an MMRU should switch modes, such as for network performance reasons, the external controller 205 may instruct the MMRU and associated DU with the worst performance as indicated by the rank compared to the other MMRU and DU pairs to switch from the 7.2 split mode to the full gNB mode. Thus, the MMRUs that may still be able to operate in the 7.2 split mode may not be instructed to switch to the full gNB mode unless determined necessary by the external controller 205.

To avoid excessive switching between modes, there may be a holdover period that the MMRU 110 must stay operating on a mode before another switch. For example, when the MMRU 110 switches between the 7.2 split mode 160 and the full gNB mode 170, the MMRU 110 may stay at that mode for at least the time specified by the holdover period (e.g., thirty seconds, one minute, five minutes, thirty minutes, etc.).

Figure 3:
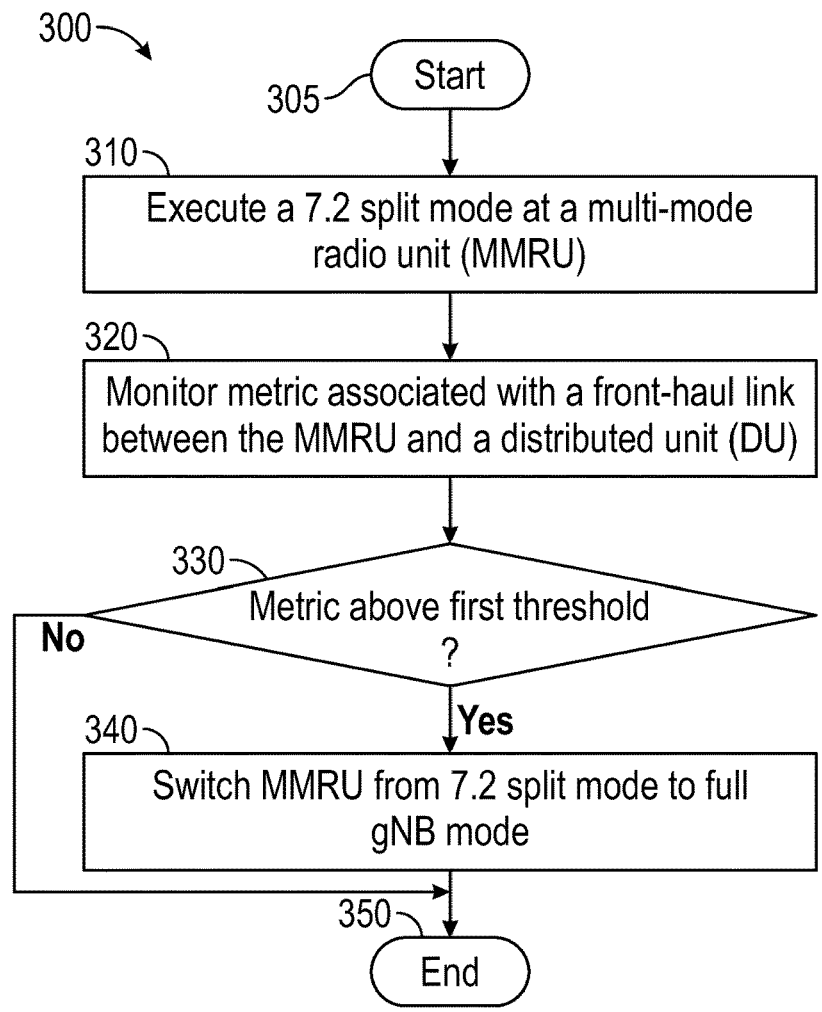
FIG. 3 is a flow chart of a method for the operation of a multi-mode radio unit.

FIG. 3 is a flow chart of a method 300 for the operation of a MMRU, such as the MMRU 110 shown in FIG. 1 and FIG. 2. The method 300 begins at starting block 305 and proceeds to operation 310, where a 7.2 split mode is executed at a MMRU. For example, the MMRU executes the 7.2 split mode as a default mode.

In operation 320, a metric associated with a front-haul link between the MMRU and a DU is monitored. For example, an external controller (e.g., an OAM system) monitors the metric by receiving information from the MMRU, the DU, and/or the network. If the metric is above the first threshold, the method 300 proceeds to operation 340. The metric being above the first threshold may indicate that the front-haul link between the MMRU and the DU is insufficient for the MMRU to operate in the 7.2 split mode. In operation 340, the MMRU switches from the 7.2 split mode to a full gNB mode. For example, the external controller may instruct the MMRU to switch modes, and the MMRU may switch from the 7.2 split mode to the full gNB mode. After operation 340 and if it is determined that the metric is not above the first threshold, the method 300 proceeds to ending block 350.

In some examples, monitoring the metric may be continuous and/or period. For example, the external controller may compare the metric to the threshold every five minutes. Thus, the method 300 may return to operation 320 from operations 330 and 340 as desired so the metric continues to be evaluated. Additionally, the metric may be evaluated to determine whether the metric moves below the threshold after operation 340 for the MMRU to be instructed to switch back to the 7.2 split mode.

Figure 4:
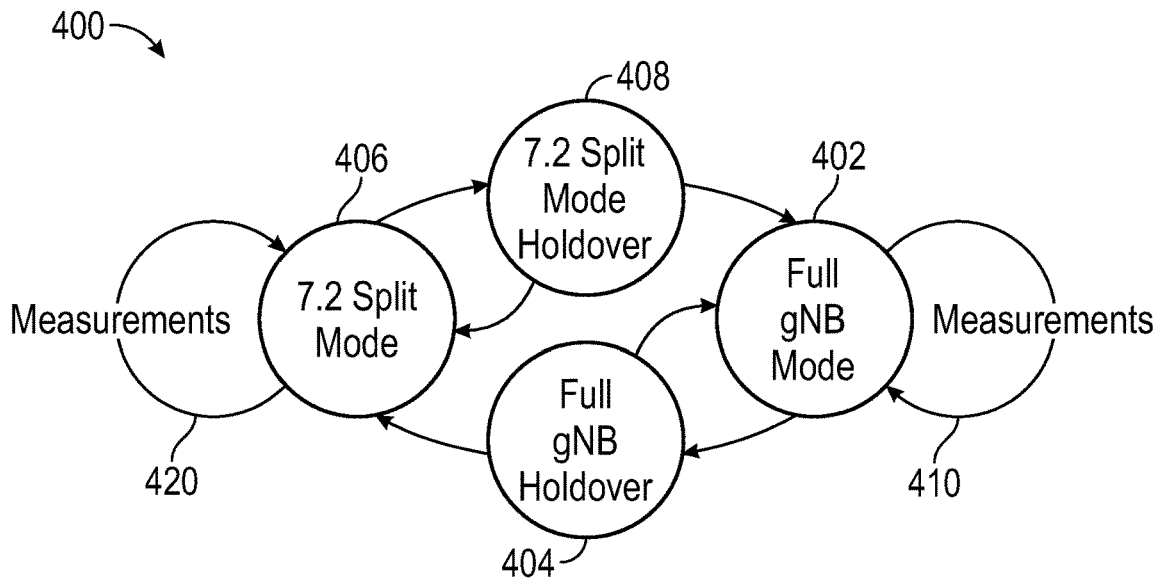
FIG. 4 is a flow chart of a multi-mode radio unit switching between a 7.2 split mode and a full gNodeB split mode.

FIG. 4 is a flow chart 400 of a MMRU switching between a 7.2 split mode and a full gNB split mode, such as MMRU 110 shown in FIG. 1 and FIG. 2. The flow chart 400 may start at full gNB mode 402 state or 7.2 split mode 406 state based on the default mode of the MMRU. Beginning at full gNB mode 402, an evaluation 410 may be performed by an external controller and/or the MMRU. The evaluation 410 may be continuously performed to determine if the MMRU, DU, network, and/or other systems indicate that the MMRU can operate in the 7.2 split mode. The current state may be sent to the full gNB holdover 404 state after each evaluation 410, so the evaluation 410 is ended and only performed periodically. Once the period defined by the full gNB holdover 404 has passed, the state may return to the full gNB mode 402 state and the evaluation 410 may resume.

When the evaluation indicates that the MMRU can switch to the 7.2 split mode, the state transitions to the 7.2 split mode state 406 via the gNB holdover state 404. The present state moving through the gNB holdover state indicates that the evaluation 420 should not occur until the period defined by the full gNB holdover 404 has passed.

When the present state is the 7.2 split mode 406 state, an evaluation 420 may be performed by an external controller and/or the MMRU. The evaluation 420 may be continuously performed to determine if the MMRU, DU, network, and/or other systems indicate that the MMRU should switch to the full gNB mode. The current state may be sent to the 7.2 split mode holdover 408 state after each evaluation 420, so the evaluation 420 is ended only performed periodically. Once the period defined by the 7.2 split mode holdover 408 has passed, the state may return to the 7.2 split mode 406 state and the evaluation 420 may resume.

When the evaluation 420 indicates that the MMRU should switch to the full gNB mode, the state transitions to the full gNB mode 402 state via the 7.2 split mode holdover 408 state. The present state moving through the 7.2 split mode holdover 408 state indicates that the evaluation 410 should not occur until the period defined by the 7.2 split mode holdover 408 state has passed.

Figure 5:
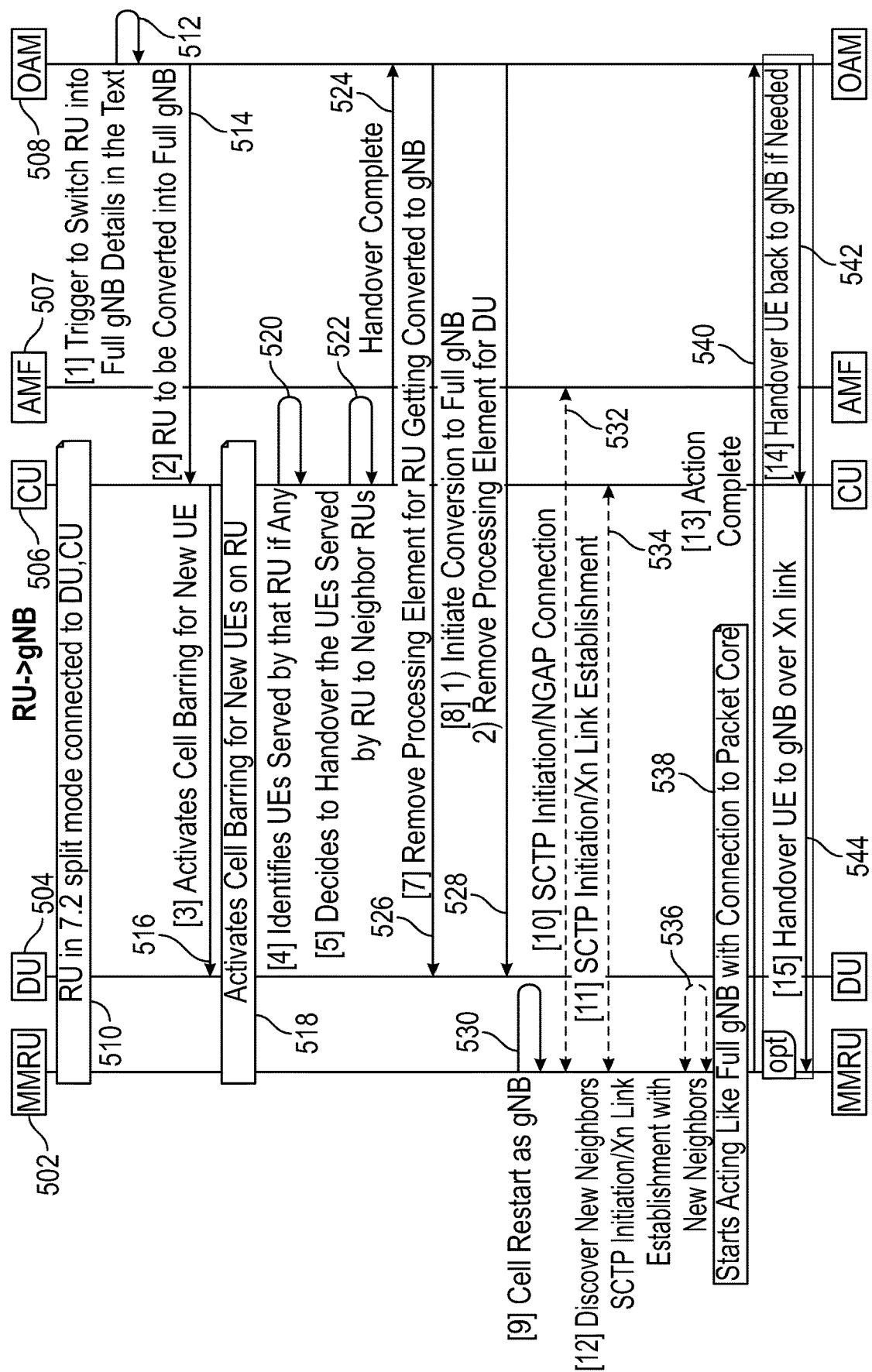
FIG. 5 is a signaling process for changing a multi-mode radio unit from a 7.2 split mode to a full gNodeB split mode.

FIG. 5 is a signaling process 500 for changing a MMRU from a 7.2 split mode to a full gNB split mode. The signaling process 500 may include a MMRU 502, a DU 504, a CU 506, an Access and Mobility Function (AMF) 507, and an OAM 508. The signaling process 500 begins at operation 510, and the MMRU 502 may execute the 7.2 split mode with the DU 504 and CU 506. In signal 512, the OAM 508 may determine that the MMRU 502 should operate in the full gNB mode. The OAM 508 may determine that the MMRU 502 should operate in the full gNB mode based on information received from the MMRU 502, the DU 504, the CU 506, the AMF 507, and/or other information and evaluations of the network.

In signal 514, the OAM 508 may notify the CU 506 that the MMRU 502 is instructed to switch to full gNB mode. In operation 516, the CU 506 may signal the DU 504 to activate cell barring for new user equipment (UE). In operation 518, cell barring for new UEs on the MMRU 502 may be activated.

In operation 520, the CU 506 may identify UEs served by the MMRU 502, and the CU 506 may determine to handover the identified UEs to other MMRUs in operation 522. In operation 524, the CU 506 notifies the OAM 508 that handover of the UEs is complete.

In signal 526, the OAM 508 may instruct the DU 504 to remove a processing element for the MMRU 502. In signal 528, the OAM 508 may instruct the MMRU 502 to switch to the full gNB mode and may remove a processing element for the DU 504.

In operation 530, the MMRU 502 may switch to the full gNB mode. In operation 532, the MMRU 502 and the AMF 507 may perform Stream Control Transmission Protocol (SCTP) initiation and NG Application Protocol (NGAP) connection. The MMRU 502 and the CU 506 may perform SCTP initiation and Xn Link establishment in operation 534.

In operation 536, the MMRU 502 may discover neighbors and perform SCTP initiation and Xn Link establishment with the discovered neighbors. In operation 538, the MMRU 502 may begin to fully operate in the full gNB mode. The MMRU 502 may inform the OAM 508 that the switch to full gNB is complete in signal 540. In signal 542, the OAM 508 may instruct the CU 506 to handover the UEs back to the MMRU 502. The CU 506 may handover the UEs to the MMRU 502 in operation 544.

Figure 6:
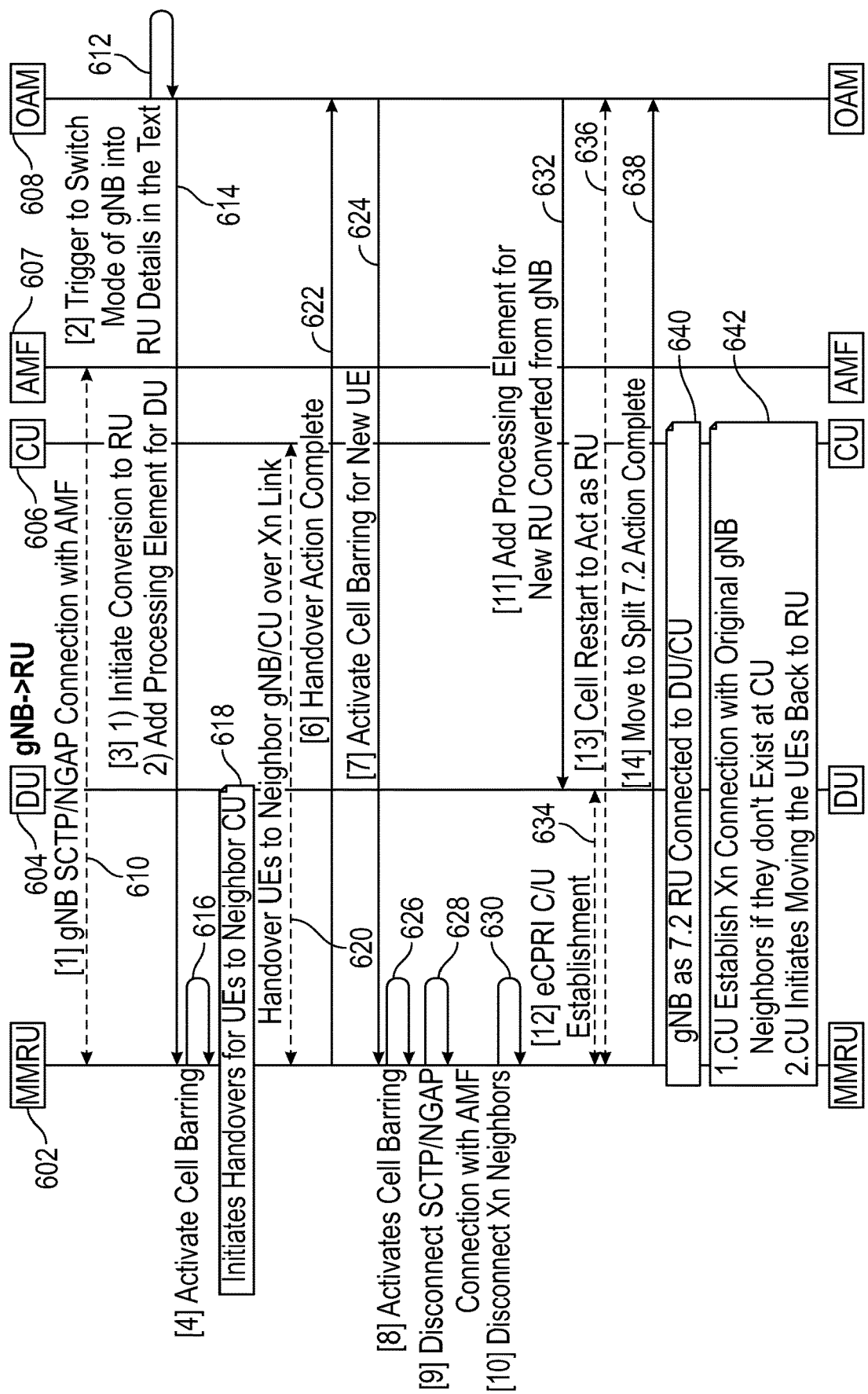
FIG. 6 is a signaling process for changing a multi-mode radio unit from a full gNodeB split mode to a 7.2 split mode.

FIG. 6 is a signaling process 600 for changing a MMRU from a gNodeB split mode to a 7.2 split mode. The signaling process 600 may include a MMRU 602, a DU 604, a CU 606, an AMF 607, and an OAM 608. The signaling process 600 begins at operation 610, and the MMRU 602 and AMF 607 may execute a gNB SCTP/NGAP connection. In operation 612, the OAM 608 may determine to instruct the MMRU 602 to switch to the 7.2 split mode. In signal 614, the OAM 608 may instruct the MMRU 602 to switch to the 7.2 split mode and to add a processing element for the DU 604. In operation 616, the MMRU 602 may activate cell barring. In operation 618, the MMRU 602 may initiate UE handovers to a neighbor CU. The MMRU 602 and the CU 606 may handover UEs to neighbor CU in operation 620.

In signal 622, the MMRU 602 may inform the OAM that the handover of UEs is complete. The OAM 608 may instruct the MMRU 602 to activate cell barring for new UEs in signal 624. The MMRU 602 may activate cell barring for new UEs in operation 626. In operation 628, the MMRU 602 may disconnect the SCTP/NGAP connection with the AMF 607. In operation 630, the MMRU may disconnect with Xn Link neighbors.

The OAM 608 may instruct the DU 604 add a processing element for the MMRU 502 in signal 632. In operation 634, the MMRU 502 and the DU 504 may perform eCPRI C/U establishment. In operation 636, the MMRU 602 may switch to the 7.2 split mode. The MMRU 602 may inform the OAM 608 that the switch to the 7.2 split mode is complete in signal 638. In operation 640, the MMRU 602, the DU 604, and the CU 606 may establish connections to operate in the 7.2 split mode. In operation 642, the CU 606 may establish an Xn connection with original neighbors and initiate the handover of UEs back to the MMRU 602.

Figure 7:
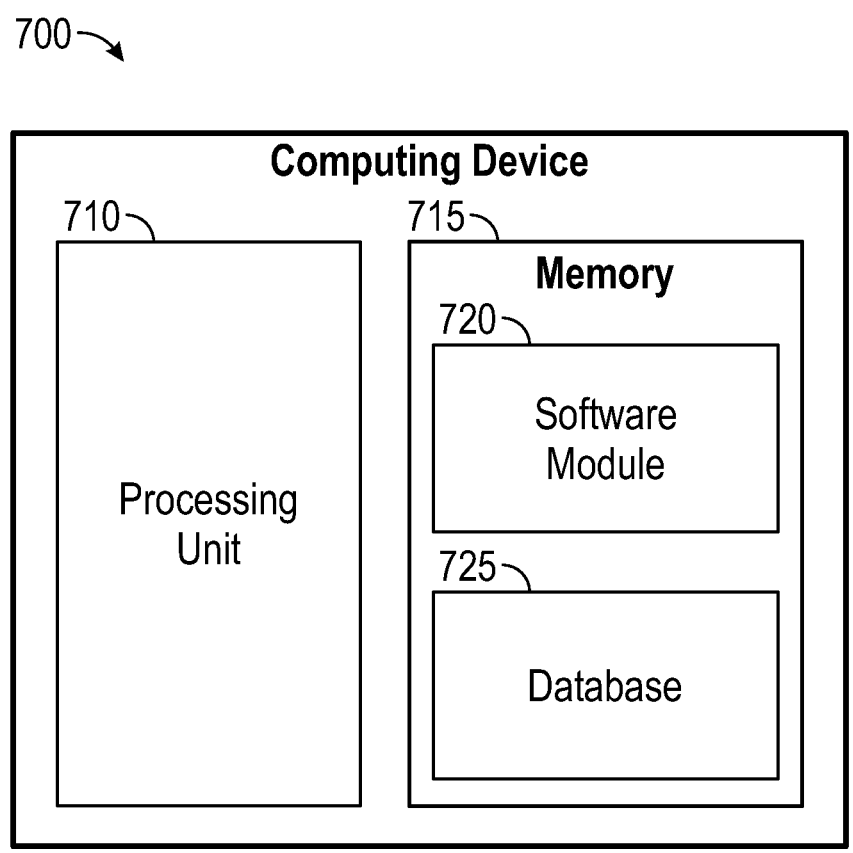
FIG. 7 is a block diagram of a computing device.

FIG. 7 is a block diagram of a computing device. As shown in FIG. 7, computing device 700 may include a processing unit 710 and a memory unit 715. Memory unit 715 may include a software module 720 and a database 725. While executing on processing unit 710, software module 720 may perform, for example, processes for providing a multi-mode radio unit with respect to FIG. 1, FIG. 2, FIG. 3, FIG. 4, FIG. 5, and FIG. 6. Computing device 700, for example, may provide an operating environment for the UE 102, the base station 104, the MMRU 110, the DU 112, the CU 114, the network core 106, the MMRU 502, the DU 504, CU 506, AMF 507, the OAM 508, the MMRU 602, the DU 604, CU 606, AMF 607, the OAM 608 and/or any other system described herein. The UE 102, the base station 104, the MMRU 110, the DU 112, the CU 114, the network core 106, the MMRU 502, the DU 504, CU 506, AMF 507, the OAM 508, the MMRU 602, the DU 604, CU 606, AMF 607, the OAM 608 and/or any other system described herein may operate in other environments and are not limited to computing device 700.

Computing device 700 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 700 may comprise any computer operating environment, such as hand-held devices, multiprocessor systems, microprocessor-based or programmable sender electronic devices, minicomputers, mainframe computers, and the like. Computing device 700 may also be practiced in distributed computing environments where tasks are performed by remote processing devices. The aforementioned systems and devices are examples, and computing device 700 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 700 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
   executing a 7.2 split mode at a Multi-Mode Radio Unit (MMRU);
   monitoring a metric associated with a front-haul link between the MMRU and a Distributed Unit (DU);
   comparing the metric to a first threshold; and
   when the metric is above the first threshold, switching the MMRU from the 7.2 split mode to a full gNodeB (gNB) mode, wherein higher physical layer, link layer, and network layer functions are integrated.

2. The method of claim 1, further comprising:
   ending comparing the metric to the first threshold;
   resuming comparing the metric to the first threshold after a holdover period; and
   when the metric is below the first threshold, switching the MMRU from the full gNB mode to the 7.2 split mode.

3. The method of claim 2, further comprising:
   ending comparing the metric to the first threshold;
   resuming comparing the metric to the first threshold after a second holdover period; and
   when the metric is above the first threshold, switching the MMRU from the 7.2 split mode to the full gNB mode.

4. The method of claim 1, further comprising:
   monitoring a second metric associated with the operation of the DU;
   comparing the second metric to a second threshold; and
   when the second metric is above the second threshold, switching the MMRU from the 7.2 split mode to the full gNB mode.

5. The method of claim 1, further comprising:
   monitoring a second metric associated with the operation of an enhanced Common Public Radio Interface (eCPRI);
   comparing the second metric to a second threshold; and
   when the second metric is above the second threshold, switching the MMRU from the 7.2 split mode to the full gNB mode.

6. The method of claim 1, further comprising:
   monitoring a second metric associated with the performance of a network;
   comparing the second metric to a second threshold; and
   when the second metric is above the second threshold, switching the MMRU from the 7.2 split mode to the full gNB mode.

7. The method of claim 6, wherein the performance of the network comprises (i) an error rate, (ii) a type of a request, (iii) a current capacity of the network, or (iv) a combination of (i), (ii), and (iii).

8. A system comprising:
   a memory storage; and
   a processing unit coupled to the memory storage, wherein the processing unit is operative to:
   execute a 7.2 split mode at a Multi-Mode Radio Unit (MMRU);
   monitor a metric associated with a front-haul link between the MMRU and a Distributed Unit (DU);
   compare the metric to a first threshold; and
   when the metric is above the first threshold, switch the MMRU from the 7.2 split mode to a full gNodeB (gNB) mode, wherein higher physical layer, link layer, and network layer functions are integrated.

9. The system of claim 8, wherein the processing unit is further operative to:
   end comparing the metric to the first threshold;
   resume comparing the metric to the first threshold after a holdover period; and
   when the metric is below the first threshold, switch the MMRU from the full gNB mode to the 7.2 split mode.

10. The system of claim 9, wherein the processing unit is further operative to:
    end comparing the metric to the first threshold;
    resume comparing the metric to the first threshold after a second holdover period; and
    when the metric is above the first threshold, switch the MMRU from the 7.2 split mode to the full gNB mode.

11. The system of claim 8, wherein the processing unit is further operative to:
    monitor a second metric associated with the operation of the DU;
    compare the second metric to a second threshold; and
    when the second metric is above the second threshold, switch the MMRU from the 7.2 split mode to the full gNB mode.

12. The system of claim 8, wherein the processing unit is further operative to:

monitor a second metric associated with the operation of an enhanced Common Public Radio Interface (eCPRI);
compare the second metric to a second threshold; and
when the second metric is above the second threshold, switch the MMRU from the 7.2 split mode to the full gNB mode.

13. The system of claim 8, wherein the processing unit is further operative to:
monitor a second metric associated with the performance of a network;
compare the second metric to a second threshold; and
when the second metric is above the second threshold, switch the MMRU from the 7.2 split mode to the full gNB mode.

14. The system of claim 13, wherein the performance of the network comprises (i) an error rate, (ii) a type of a request, (iii) a current capacity of the network, or (iv) a combination of (i), (ii), and (iii).

15. A non-transitory computer-readable medium that stores a set of instructions which when executed enable a processor to perform a method comprising:
executing a 7.2 split mode at a Multi-Mode Radio Unit (MMRU);
monitoring a metric associated with a front-haul link between the MMRU and a Distributed Unit (DU);
comparing the metric to a first threshold; and
when the metric is above the first threshold, switching the MMRU from the 7.2 split mode to a full gNodeB (gNB) mode.

16. The non-transitory computer-readable medium of claim 15, further comprising instructions for:
ending comparing the metric to the first threshold;
resuming comparing the metric to the first threshold after a holdover period; and
when the metric is below the first threshold, switching the MMRU from the full gNB mode to the 7.2 split mode.

17. The non-transitory computer-readable medium of claim 16, further comprising instructions for:
ending comparing the metric to the first threshold;
resuming comparing the metric to the first threshold after a second holdover period; and
when the metric is above the first threshold, switching the MMRU from the 7.2 split mode to the full gNB mode, wherein higher physical layer, link layer, and network layer functions are integrated.

18. The non-transitory computer-readable medium of claim 15, further comprising instructions for:
monitoring a second metric associated with the operation of the DU;
comparing the second metric to a second threshold; and
when the second metric is above the second threshold, switching the MMRU from the 7.2 split mode to the full gNB mode.

19. The non-transitory computer-readable medium of claim 15, further comprising instructions for:
monitoring a second metric associated with the operation of an enhanced Common Public Radio Interface (eCPRI);
comparing the second metric to a second threshold; and
when the second metric is above the second threshold, switching the MMRU from the 7.2 split mode to the full gNB mode.

20. The non-transitory computer-readable medium of claim 15, further comprising instructions for:
monitoring a second metric associated with the performance of a network;
comparing the second metric to a second threshold; and
when the second metric is above the second threshold, switching the MMRU from the 7.2 split mode to the full gNB mode.

* * * * *